United States Patent [19]

Garner

[11] 4,116,647
[45] Sep. 26, 1978

[54] AIR CLEANER
[75] Inventor: Herman H. Garner, Claremont, Calif.
[73] Assignee: Vortox Company, Claremont, Calif.
[21] Appl. No.: 781,883
[22] Filed: Mar. 28, 1977

Related U.S. Application Data
[63] Continuation of Ser. No. 664,551, Mar. 8, 1976, abandoned.

[51] Int. Cl.² .............................................. B01D 47/02
[52] U.S. Cl. ...................................... 55/223; 55/253; 261/DIG. 54
[58] Field of Search ................ 55/223, 238, 239, 241, 55/249, 250, 252, 253, 259, 503, 251; 261/DIG. 54

[56] References Cited
U.S. PATENT DOCUMENTS

| | | | |
|---|---|---|---|
| 2,171,752 | 9/1939 | Kamrath | 55/249 |
| 2,387,278 | 10/1945 | Lowther | 55/253 |
| 2,397,525 | 4/1946 | Bennett | 55/249 |
| 2,406,188 | 8/1946 | Beatty et al. | 55/253 |
| 2,596,121 | 5/1952 | Brixius | 55/249 |
| 2,701,029 | 2/1955 | Fier | 55/253 |
| 2,770,320 | 11/1956 | Dreznes | 55/503 |
| 2,953,217 | 9/1960 | Turner et al. | 55/253 |
| 3,131,237 | 4/1964 | Collins, Jr. | 55/223 |
| 3,756,580 | 9/1973 | Dunn | 261/DIG. 54 |

FOREIGN PATENT DOCUMENTS 1,141,541 9/1957 France ...................................... 55/249

Primary Examiner—Frank W. Lutter
Assistant Examiner—David L. Lacey
Attorney, Agent, or Firm—Harris, Kern, Wallen & Tinsley

[57] ABSTRACT

An air cleaner of the oil-bath type, in which dust-laden air at high velocity in an entry stream is first mixed with an oil spray and then impinged on an oil bath and deflected outwardly and upwardly through a filter bed to wet the filter bed with oil for catching dust carried by the air, surplus oil being drawn by venturi action from the filter bed and sprayed back into the entry stream for recirculation into the oil bath and into the filter bed, constantly washing the lower end of the filter bed and other parts so as to prevent clogging by the accumulation of dust.

2 Claims, 3 Drawing Figures

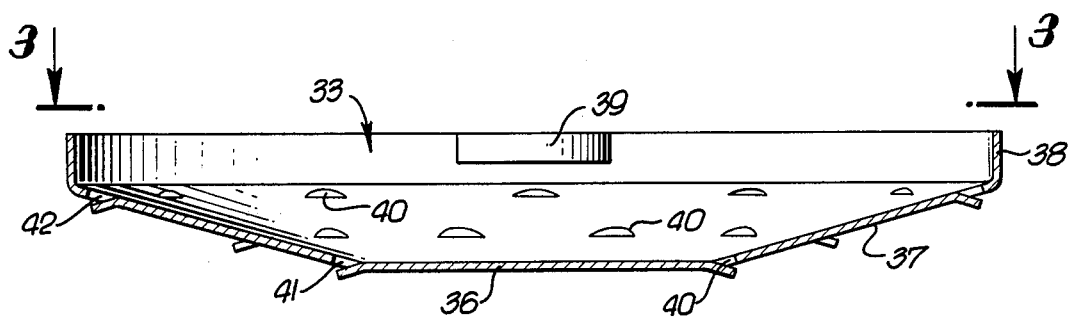
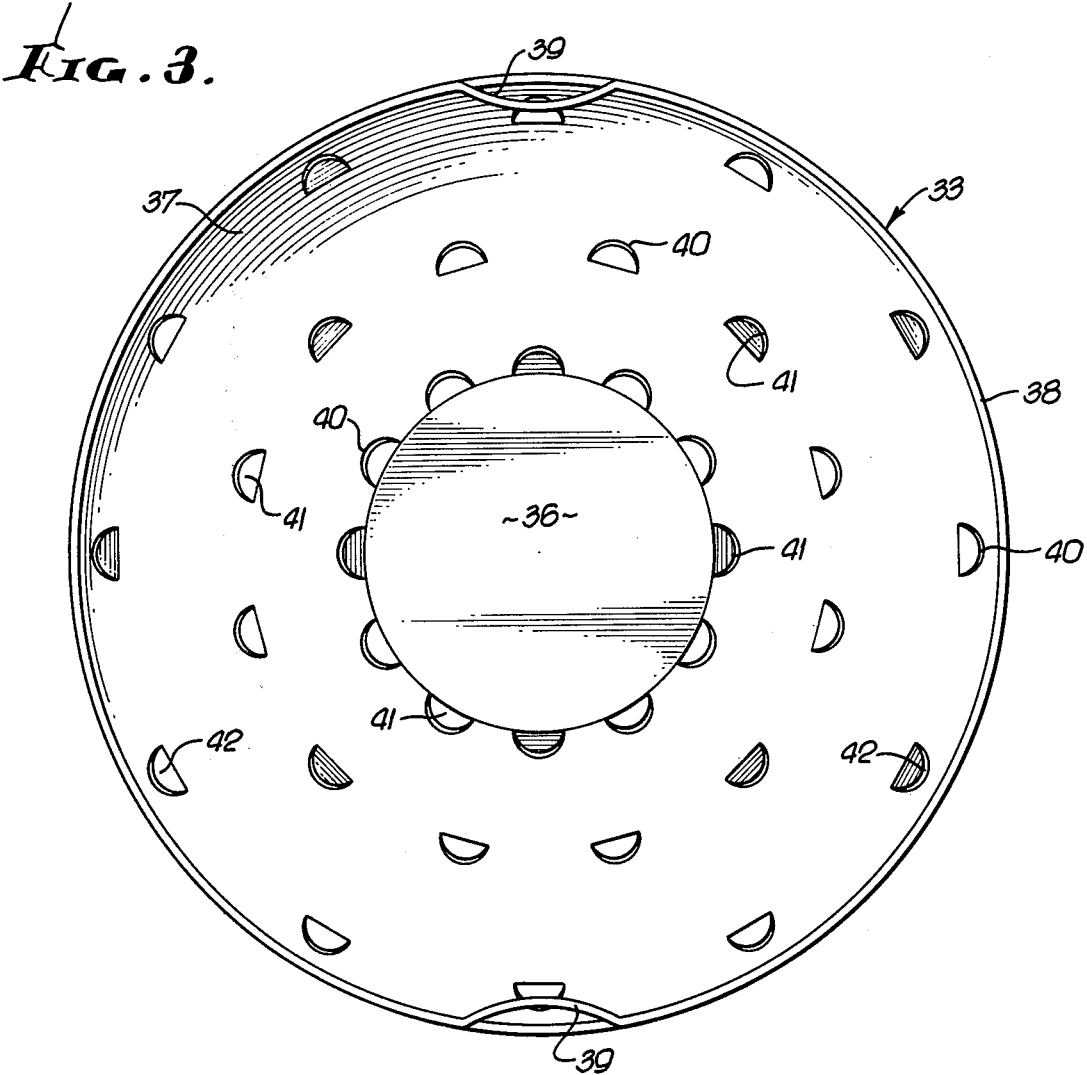

AIR CLEANER

This application is a continuation of my application Ser. No. 664,551, filed Mar. 8, 1976, and now abandoned.

BACKGROUND OF THE INVENTION

Air cleaners of the oil-bath type, generally similar to the present invention, are old and well-known in the art. Such conventional air cleaner is shown and described in the patent to K. F. Russell, U.S. Pat. No. 2,457,321, issued Dec. 28, 1948. Such air cleaners are commonly used for removing dust from an air stream supplying the carburetor of an internal combustion engine. They commonly impinge a dust-laden air stream traveling at relatively high velocity against an oil-bath to pick up oil, deposit some dust in the oil bath, and deflect the air stream outwardly and upwardly into a vertical filter bed which is at least partially coated with such oil to catch dust traveling in the air stream, some of the oil in the filter bed settling downwardly by gravity and returning to the oil bath only when the air flow stops or is slowed down sufficiently.

Although such conventional air cleaners have a high efficiency of removing dust from air passing therethrough, and a relatively high dust-holding capacity, the latter is limited by relatively low recirculation of dust-laden oil from the filter bed back into the oil bath.

The Invention-Generally

It is a primary object of the present invention to improve the dust-removal efficiency of such conventional air cleaners and to substantially increase their dust-holding capacity. This is accomplished in part by providing a positive suction of dust-laden oil from the filter bed, spraying it back into the entry air stream flowing at relatively high velocity, by venturi action created by said entry stream. It is also accomplished in part by the provision of an improved deflector plate in the oil-bath of the device and against which the entry stream of air and oil spray impinges and is directed outwardly and upwardly to the filter bed, the deflector plate being formed so that the impingement of the air stream thereon will drive dust-laden oil from the top thereof downwardly into the oil bath beneath the plate for the gravity separation of dust therefrom and to draw relatively clean oil upwardly from the oil bath into the air stream for conveyance thereby into the filter bed.

Other objects and advantages of the invention will apear from the following specification.

THE DRAWINGS

In the drawings, which are for the purpose of illustration only:

FIG. 2 is an enlarged sectional view of the deflector plate of the invention; and FIG. 3 is a plan view of the deflector plate.

DETAILED DESCRIPTION OF THE INVENTION

Figure 1:
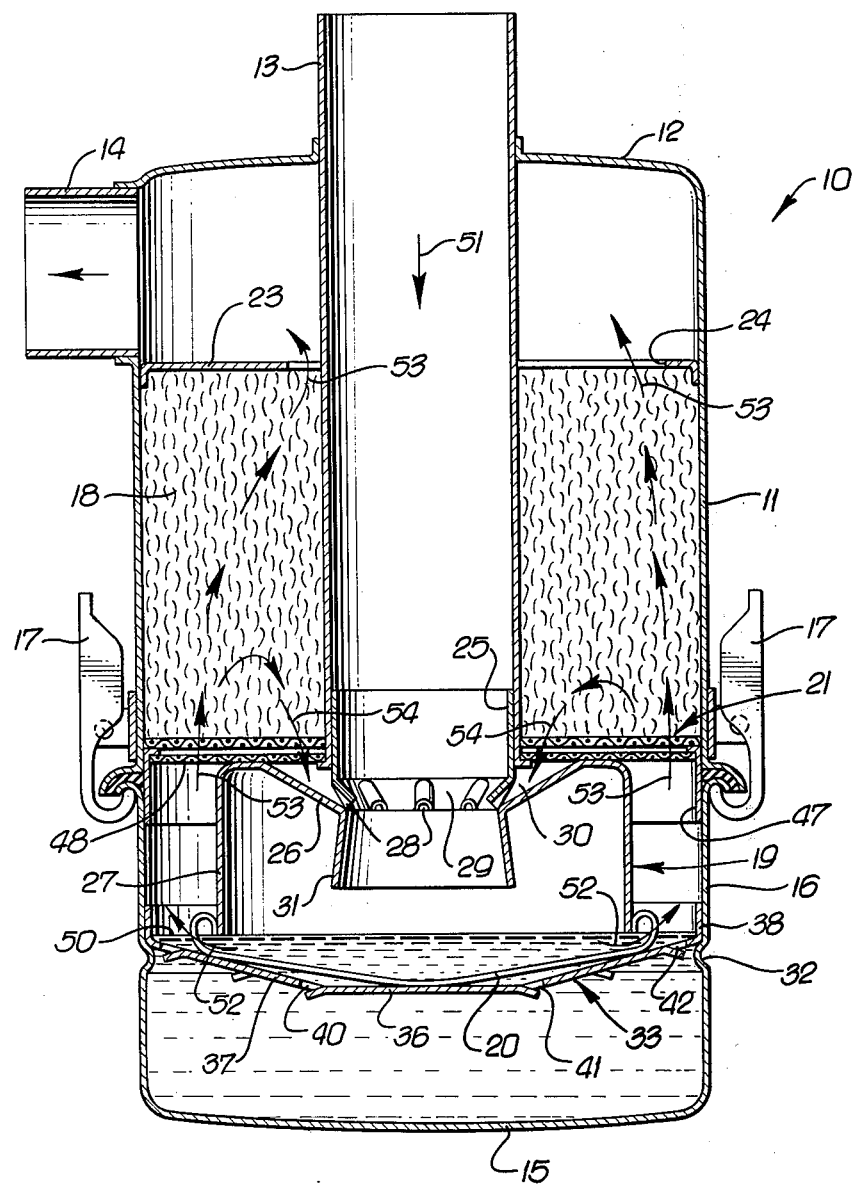
FIG. 1 is a vertical sectional view of the air cleaner of the invention.

Referring to the drawings, FIG. 1 shows an air cleaner 10, of the oil-bath type, having an outer cylindrical shell 11 provided with an annular closed top 12 through which extends a cylindrical air inlet tube 13 concentric with the axis of the shell 11, an outlet tube 14 radially connected to the shell 11, an oil bath cup 16 at the lower end of the shell 11 and detachably connected to the shell by clamps 17, an annular filter bed 18 around the inlet tube 13 and in the shell 11, a cylindrical baffle assembly 19, a flat spring 20 attached thereto, and an open mesh screen 21 supporting filter bed 18 and a secondary removable chaff catching screen 48. The clamps 17 are substantially like the clamps 26 of said U.S. Pat. No. 2,457,321 and as shown and described therein. The shell 11 and cup 16 form a shell means having a closed bottom 15.

The filter bed 18 is confined and held in place in the shell 11 by the open mesh screen 21 and an annular plate 23 secured, as by welding, in the shell and having a circular opening 24, the center of which is eccentric to the axis of the inlet tube 13 being centered opposite the outlet tube 14. The filter bed 18 may be of any suitable material such as a very light weight expanded metal or knitted fine flat wire that can be wound around inlet tube 13 forming a filter medium adapted to collect oil and dust from an air stream passing therethrough.

The removable baffle assembly 19 has a tubular upper portion 25 which makes a close sliding fit in the lower end of the inlet tube 13, has an annular top cover member 26, depressed around the junction with the tubular portion 25 forming an oil sump 30 and a tubular outer skirt 27 extending downwardly into the cup 16 and concentric therewith. The lower end of tube 25 is crimped to form a venturi means 29 and to provide a plurality of fluted openings 28 spaced around the periphery thereof and leading from the oil sump 30 to the inside of the venturi means 29. Such top cover 26 and its operation are important features of the invention, as described hereinafter. A flared inner skirt 31, concentric with the outer skirt 27, forms part of the venturi means 29.

The cup 16, the lower portion of which forms a liquid reservoir, has an annular crimp 32 which provides an inner ledge which supports a circular deflector plate 33, which is an important feature of the invention. The deflector plate 33, as best shown in FIGS. 2 and 3 is preferably formed of metal with a central more or less flat impervious area 36 and an outer annular area 37 which slopes upwardly and outwardly to a vertical annular rim 38 which may be formed to provide a pair of handles 39 to facilitate manual removal of the deflector plate from the cup 16.

Referring to FIGS. 2 and 3 the outlet annular area 37 of the deflector plate 33 is provided with rows of more or less semicircular cuts 40 with the inside of the semicircle bent down to form inner rows of openings 41 and outer row of openings 42 and so arranged that each opening faces toward the center of deflector plate 33 for a purpose to be described hereinafter.

As shown in FIG. 1 a flat spring 20 attached to the bottom of baffle assembly 19 bears on the center of the deflector plate 33 holding the two units in their assembled positions as shown. The top cover 26 of baffle assembly 19 also bears against the secondary removable chaff catching screen 48, holding it up against the open mesh screen 21 which is held permanently in place by retainer skirt 47 as shown.

The filter bed 18 may be formed of a suitable material such as a very light expanded metal or knitted flat wire wound around inlet tube 13 permeable to air flow therethrough but adapted to catch oil and dust and other foreign material carried by an air stream passing therethrough. It is supported on open mesh screen 21 which is permanently supported on retainer skirt 47. The chaff catcher 48 is easily removed along with the baffle assembly 19 which holds it in place and may be built up of several layers of material such as two moderately heavy expanded metal pieces to give it strength and rigidity with three or four layers of very lightweight expanded metal sandwiched between to provide the necessary fine mesh to catch chaff and other large particles impinged thereon by an air stream.

The clamps 17 may be as shown and described in said U.S. Pat. No. 2,457,321 and are adapted to hold the cup 16 and outer shell 11 together as shown in FIG. 1, but are readily opened manually to permit the cup, deflector plate 33, also baffle assembly 19 together with venturi tube 25 and spring 20 and chaff catcher 48 to be detached from the outer shell for cleaning or other purposes, and the parts readily may be reassembled by a reverse operation.

In operation, the outlet tube 14 is normally connected to the intake of the carburetor (not shown) of an internal combustion engine which in operation will impose a suction in the outlet tube which in turn will draw air into the air inlet tube 13, downwardly therethrough and through the upper portion 25 of the venturi means 29, through the baffle assembly 19, upwardly around the baffle assembly through the chaff catcher 48, upwardly through the filter bed 18, through the opening 24 in the plate 23, into the open upper end of the shell 11 and out of it through the outlet tube 14. The rate of such air flow through the air cleaner 10 of course depends upon the suction imposed upon the outlet tube 14 by the speed at which the internal combustion engine to which the air cleaner is connected and the dimensions of the parts of the air cleaner, and such air flow may vary widely from only a few cubic feet per minute to over 1000 c.f.m. Such air flow entering the air cleaner 10 through the inlet tube 13 commonly contains dust and other foreign materials from the ambient atmosphere, in widely varying quantities dependent upon ambient conditions. Preparatory to operation of the air cleaner 10, the cup 16 is filled with a suitable oil, e.g. 10-20 SAE, up to about the level 50, and such oil forms an oil bath.

The operation of the air cleaner 10, in more detail, is that dust-laden air enters the inlet tube 13 and passes downwardly therethrough in the direction of the arrow 51 at relatively high velocity and is discharged at increased velocity past the lower ends of the radial openings 28 in the venturi means 29, spraying oil into the high velocity air stream just as gasoline is sprayed into the air stream in a carburetor. Such air stream and oil spray mixture impinges on the oil flooded surface of the deflector plate 33 sweeping all surplus oil from above the plate with it as it passes outwardly, again at high velocity in the direction of arrows 52 under the lower edge of baffle assembly 19 impinging on the oil flooded wall of cup 16. Such air stream then passes upwardly, in the direction of arrow 53 carrying droplets of oil with it, through the removable chaff catcher 48, through the filter bed 18 where it leaves the oil in oil sump 30, then through the opening 24 and outwardly through the outlet tube 14 to the engine to which the air cleaner is suitably connected.

It is recommended that the cup 16 be filled to the oil level line 50, almost touching the bottom edge of baffle assembly 19 so that when the air flow is very low, insufficient to carry the oil up into the filter bed 18, as when the engine to which the air cleaner is connected is idling very slowly, the air stream will still pass under the edge of baffle 19 with high velocity, spattering oil on the wall of cup 16 and impinging thereon, leaving any dust particles it may contain in the oil.

However, when the engine is called on to deliver power and the air flow increases, the considerable volume of oil in the cup 16 above deflector plate 33 is swept up into filter bed 18 as previously explained. Because of the high velocity of air flow at the periphery of filter bed 18 where it enters, the oil circulates well up into the filter bed, returning back down in the quieter zone around inlet tube 13 protected by baffle assembly 19 where it settles as indicated by arrows 54 in the oil sump 30 formed by the central depressed area of top cover 26 around fluted openings 28, to be sprayed by venturi action into the incoming air stream and recirculated as described.

The baffle assembly 19 performs several important functions. It shields the central portion of filter bed 18 providing a relatively quiet zone for return of circulating oil. The depressed center portion of the top cover 26 forms an oil sump 30 around the fluted opening 28. The upper portion 25 with its constricted portion of venturi means 29, attached to top cover 26 provides the suction to draw the oil from oil sump 30 spraying it through fluted openings 28 into the incoming air stream. The spring 20 attached to the bottom of outer skirt 27 presses down on the center portion 36 of deflector plate 33 while the outer rim of top cover 26 presses up on the chaff catcher 48 holding all parts in place under spring tension but removable for cleaning. The flared inner skirt 31 as a normal part of the venturi medium, has only one purpose and that is to regain the energy used to increase the velocity of the air stream to provide suction at fluted openings 28 by again reducing this velocity thus reducing the overall restriction to air flow through the air cleaner.

Since it has been found that the restriction to be regained by the use of the flared inner skirt 31 is not a large part of the total restriction and the high velocity of the air stream passing fluted openings 28 and impinging on the flat area 36 of deflector plate 33 is useful in removing dust from said air stream it may, in some cases, be better to omit the flared inner skirt 31.

The outer skirt 27 and top cover 26 of baffle assembly 19 form a baffle to guide the air flow and trap the oil spatter, in case of a sudden reversal of direction caused by a back-fire explosion in the engine, to prevent oil being blown out through inlet tube 13.

The purpose of the eccentricity of the large opening 24 in the annular plate 23, centering it away from outlet tube 14 is to guide the direction of air flow through filter bed 18 preventing a strong draft of air flow toward outlet 14 carrying oil out through outlet tube 14 with it.

Airborne dust particles entering through inlet tube 13 first come in contact with the oil spray entering through fluted openings 28 where a large part are trapped in the oil spray then the remaining particles are impinged along with the oil spray on the oil flooded surface 36 of the deflector plate 33 where more are trapped by centrifugal force into the oil as the air stream is turned outward under outer skirt 27 of baffle assembly 19 and over outer annular area 37 toward the wall of the cup 16 where again more are trapped in the oil by high velocity impingement. This leaves only a small part of the dust load of the incoming air to be trapped in the oil in the filter bed 18 greatly improving the efficiency of the air cleaner, a primary object of the invention.

Part of the oil which has been impinged on the surface 36 of deflector plate 33, and is flowing outwardly with the air stream, enters the inner rows of openings 41 carrying its accumulated load of dust particles with it into the relatively quiet mass of oil underneath the plate. Here the dust particles gradually settle out by gravity forming a solid mass on the bottom 15 of cup 16. As the dirty oil enters inner openings 41 the cleaner oil, from which the dust particles have settled out, flows out through the outer row of openings 42 where the air stream picks it up spraying it into chaff catcher 48 and on up into filter bed 18.

Due to the constant washing action of the oil spray the deflector plate 33, the filter bed 18, and other parts are kept relatively clean so that restriction to air flow due to accumulations of dust particles does not build up rapidly and the effective life of the air cleaner 10 before cleaning is required is substantially prolonged which is an important object of the invention.

Periodically, when the thickness of the cake of dust collected in the bottom of the cup 16 approaches the bottom of the deflector plate 33 the clamps 17 should be released, the cup 16 should be removed, baffle assembly 19 with attached spring 20 and chaff catcher 48 being removed along with the cup.

The deflector plate 33 may be removed from the cup 16 by the handles 39 to permit the dirty oil and caked dust to be removed from the cup. Any adhering dust found on the deflector plate 33 or on the baffle assembly 19 and any chaff and other debris found on the chaff catcher 48 should be removed.

The deflector plate 33 is then replaced in the cup 16; clean oil filled to the oil level line 50, the baffle assembly 19 with spring 20 and chaff catcher 48 in place, placed in the cup and the whole replaced in proper position and clamped on to shell 11 with clamps 17 without in any way disturbing the connection of the air cleaner 10 to the engine. The fresh clean oil in the cup will immediately wash out any dirty oil left in the filter bed 18 or other places when the air cleaner goes into active service.

Although I have shown and described a preferred form of the invention, it is to be understood that certain elements thereof may be altered without departing from the spirit of the invention, and I do not intend to be limited to the specific form so shown and described but desire to be afforded the full scope of the following claims.

I claim:

1. In an air cleaner of the oil-bath type, the combination of:
    (a) outer shell means defining an upper filter chamber and cup means connected to said shell means defining a lower reservoir;
    (b) a filter in said filter chamber and oil filling said reservoir to a static oil level;
    (c) air inlet means extending downwardly through said filter chamber toward said reservoir and terminating in a lower end portion above said static oil level;
    (d) venturi means encircling said lower end portion of said air inlet means, above said static oil level, for drawing oil from said filter chamber and for spraying such oil into the air flowing downwardly through said lower end portion of the air inlet means, at a level above said static oil level; and;
    (e) air outlet means connected to said shell means and in communication with said filter chamber.

2. An air cleaner according to claim 1 including a relatively flat, dish-like deflector means in said reservoir below said lower end portion of said air inlet means and below said static oil level and provided with openings therein.

* * * * *